United States Patent [19]

Weiser

[11] 4,165,476
[45] Aug. 21, 1979

[54] LOW LOSS, RESETTABLE EXCITATION CONTROL FOR AN INDUCTIVE LOAD

[75] Inventor: Earnest F. Weiser, Erie, Pa.

[73] Assignee: General Electric Company, Erie, Pa.

[21] Appl. No.: 859,769

[22] Filed: Dec. 12, 1977

[51] Int. Cl.$^2$ .............................................. H02P 5/06
[52] U.S. Cl. .................................... 318/493; 318/338; 318/375; 318/381; 318/536
[58] Field of Search ............... 318/375, 377, 376, 380, 318/381, 528, 537, 250, 249, 338, 493

[56] References Cited

U.S. PATENT DOCUMENTS

| | | | |
|---|---|---|---|
| 3,221,234 | 11/1966 | Ault | 318/250 |
| 3,486,102 | 12/1969 | Wilkerson | 318/376 |
| 3,544,873 | 12/1970 | Gunsser et al. | 318/376 |
| 3,803,468 | 4/1974 | Soeda | 318/249 |
| 4,017,777 | 4/1977 | Bailey | 318/342 |
| 4,096,423 | 6/1978 | Bailey et al. | 318/370 |

*Primary Examiner*—David Smith, Jr.
*Attorney, Agent, or Firm*—James H. Beusse

[57] ABSTRACT

In a power control system in which a time ratio control power circuit regulates the average current in an inductive load by repetitively connecting and disconnecting the load and a d-c power source, a variable impedance is connected in parallel circuit relationship with the load and is controlled so as to vary the inductive-resistive time constant of the load circuit. When necessary to rapidly reduce the current in the load, the impedance is made relatively large so that current rapidly decays. Conversely, the impedance is maintained at a minimum value when the load current is less than or substantially equal to a desired value.

8 Claims, 3 Drawing Figures

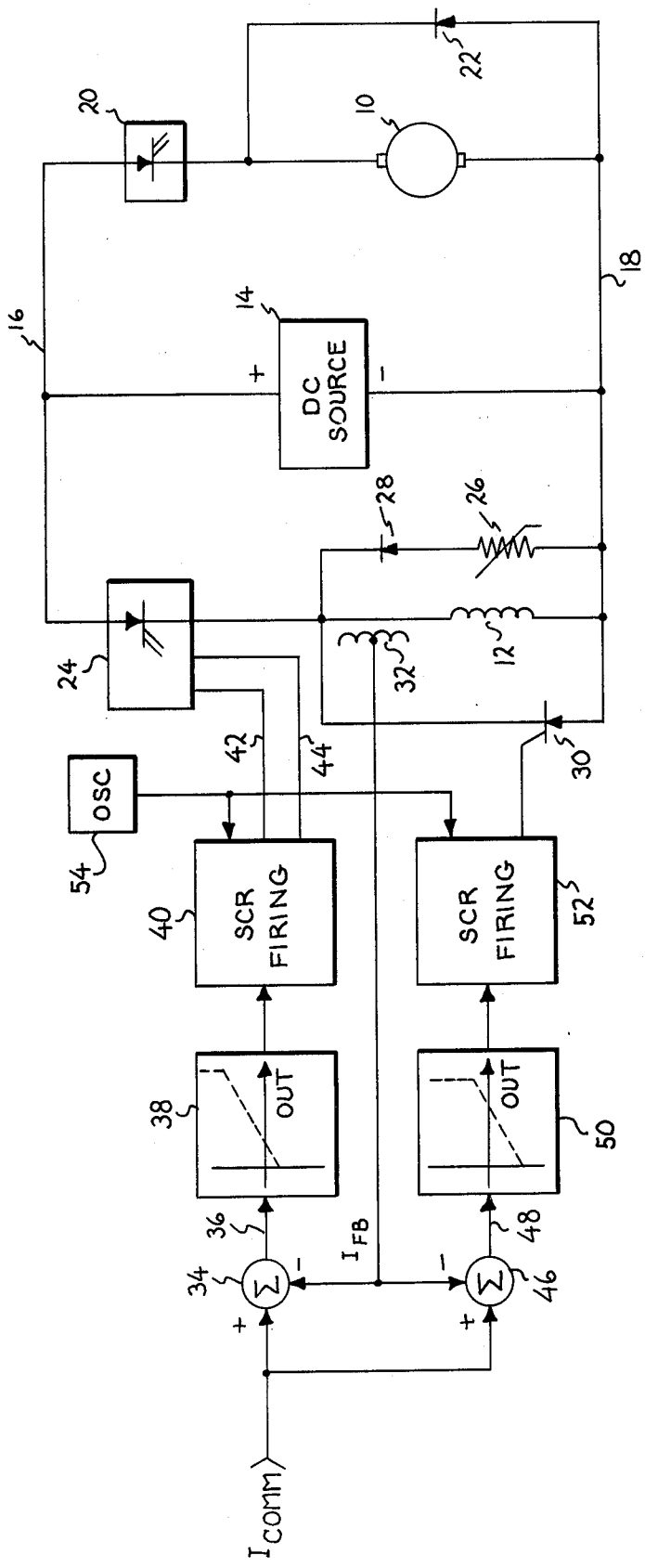
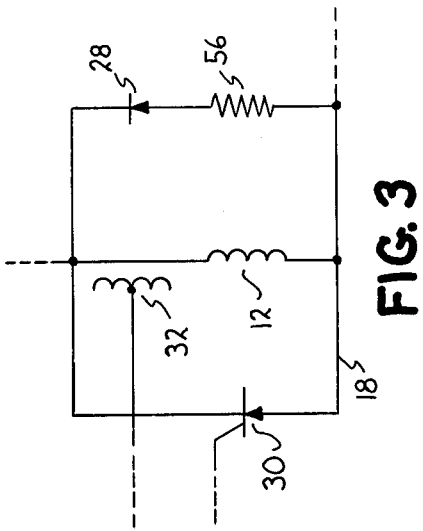
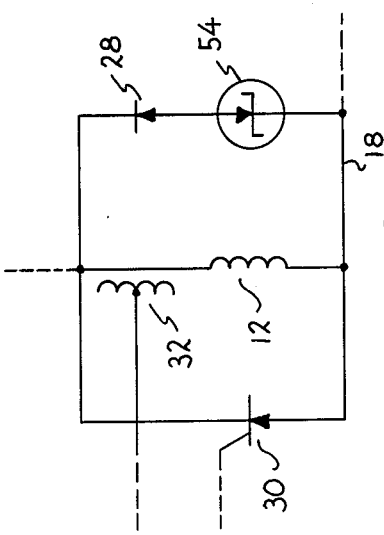
FIG. 1
FIG. 2
FIG. 3

LOW LOSS, RESETTABLE EXCITATION CONTROL FOR AN INDUCTIVE LOAD

BACKGROUND OF THE INVENTION

The present invention relates to current control systems for inductive loads and, more particularly, to a time ratio controlled switching system including a controllable electric valve connected for varying the time constant of the inductive load.

Many types of operating systems require control systems having a rapid response to input command signals. Control systems having high-speed response characteristics are readily implemented using solid state electronics. In applications where the high-speed control system is utilized to control or regulate the action of a system which includes inductive reactors, the advantage attendant to a high-speed control system may be partially undermined by slow response of the controlled operating system because of the delay induced by the inductive reactance. An example of such an inductive system requiring a high-speed control system is a magnetically levitated transit vehicle in which the control system must maintain a very exact displacement between the running rail and the levitated vehicle. Motor control systems may also be limited in their response characteristics by the inductive nature of the controlled motor field.

In most operating systems the response time of the controlled system can be improved by increasing the forcing function. For example, in a motor system, a command to increase motor field current can be effected rapidly by connecting the motor field to a voltage source having a potential much larger than the potential to which the motor field must be raised in order to achieve the desired current level. Since the time required to raise the field current is proportional to the applied forcing functions and the time constant (the L/R ratio) of the field, the larger forcing function permits a rapid response. In mathematical form current is defined as $$i = (V/R)e^{-(Rt/L)}$$

where V represents the magnitude of the forcing function or voltage, R represents the resistance in the current path, L represents the inductance in the current path and t represents time. Clearly, an increase in voltage V will speed up the response time of the field. However, if the desired field current is less than the actual field current, a rapid reduction in field current cannot be effected by merely reducing the applied voltage unless the system includes negative forcing functions such as may be available in an alternating current system, provision for a negative forcing function in a direct current (d-c) system being economically undesirable.

A typical example of an operating system incorporating a high-speed control system may be found in the vehicle propulsion field in which solid state electronics have been applied to control the operation of separately excited direct current electric traction motors. In this application a time ratio controlled switch or "chopper" interconnects the motor field winding to a source of d-c potential. The chopper regulates average field winding current by cyclically switching between conducting and non-conducting states. By controlling the ratio of conducting to non-conducting time, the chopper supplies variable pulse width pulses of voltage to the field winding and the inductive reactance of the field winding tends to smooth the current produced by the voltage pulses. During the non-conducting time of the chopper, field winding current circulates through a free wheeling diode connected in inverse parallel arrangement with the winding. Field winding current can be rapidly increased by the chopper by merely increasing the chopper conduction time since the voltage available to excite the field winding is generally several multiples of the voltage at which the field winding is normally operated. However, field winding current cannot be rapidly reduced since the current decay path includes only the field winding and the free wheeling diode. The decay time constant for this path is determined by the inductance of the field and its own resistance. Thus, the high speed electronic control system is unable to rapidly reduce field winding current.

One prior art solution to this problem has been to insert resistance into the field winding circuit to change the L/R time constant. This solution, however, creates a power dissipation problem since the resistor continually absorbs energy. In one such application, the energy dissipation in the resistance element during idling of the vehicle exceeded the energy requirements for normally exciting the motor field winding.

OBJECT OF THE INVENTION

It is an object of the present invention to provide a novel control arrangement for inductive loads which permits rapid response to control commands for current reduction without the use of large external forcing functions and with reduced losses during steady state operation.

SUMMARY OF THE INVENTION

The present invention overcomes the slow response time of an inductive load to a current reduction command by causing the inductive load to self-generate a relatively large reverse forcing function which rapidly drives current out of the inductive load. In a preferred embodiment in which the inductive load comprises a field winding of a d-c electric traction motor, the invention comprises a varistor connected in shunt with the field winding and a thyristor connected in lieu of the free wheeling diode. A control system supplies gating signals to control operation of the thyristor whereby the apparent resistive magnitude of the varistor may be continuously varied. The control system compares the actual magnitude of field winding current to the commanded magnitude and maintains the thyristor in conduction so long as actual current is less than or equal to commanded current. When actual current exceeds commanded current, the conduction time of the thyristor is reduced so that inductive current generated by the field winding is forced through the varistor thereby raising the magnitude of reverse field winding voltage and forcing current to more rapidly decay.

In an alternate embodiment the varistor is replaced by a zener diode with a predetermined breakover voltage to force the reverse field winding voltage to a large value. A still further embodiment replaces the varistor with a resistor and diode combination.

BRIEF DESCRIPTION OF THE DRAWINGS

The above and other objects and features of the invention will be more fully appreciated by reference to the following detailed description taken in conjunction with the accompanying drawings in which:

FIG. 1 is a simplified diagram of a separately excited d-c electric traction motor power control system incorporating the present invention;

FIG. 2 illustrates an alternate form of the system of FIG. 1; and

FIG. 3 is a still further modification of the system of FIG. 1.

DETAILED DESCRIPTION

Referring now to FIG. 1 there is shown one embodiment of the present invention incorporated into a power control system for a separately excited d-c electric traction motor having an armature 10 and a field winding 12. A d-c power source 14 is connected to supply d-c electric power to a positive power bus 16 and a negative power bus 18. D-C source 14 may be of a type well known in the art such as, for example, a prime mover/generator/rectifier combination or, in the case of a locomotive or transit vehicle, a catenary or third rail arrangement for tapping an external power source. A chopper circuit 20 serially interconnects the armature 10 between the power bus 16 and power bus 18. The chopper circuit 20 may be of the type illustrated in U.S. Pat. No. 4,037,145-Bailey et al issued July 19, 1977 and assigned to the General Electric Company. A control system (not shown) supplies gating pulses to the chopper circuit 20 to control its duty cycle and to regulate the magnitude of current flowing through armature 10. Such control systems are well known in the art and may be, for example, of the type illustrated in the aforementioned U.S. Pat. No. 4,037,145. When the chopper circuit is non-conductive the armature current circulates through a free wheeling diode 22 connected in inverse parallel relationship with the armature 10.

The field winding 12 is serially interconnected between the power buses 16 and 18 by means of a second chopper circuit 24. The chopper circuit 24 may be identical to chopper circuit 20. A thyrite or varistor 26 is connected in parallel with the field winding 12. In addition, a controllable valve illustrated as a silicon controlled rectifier (SCR) 30 is connected in parallel with field winding 12 and functions in place of a free wheeling diode to control the free wheeling current flowing through field winding 12 during the non-conductive time of chopper circuit 24. A diode 28 is connected in series with varistor 26 to prevent current supplied by chopper circuit 24 from passing through varistor 26.

The present invention contemplates a control system which regulates the conduction cycle of chopper circuit 24 and SCR 30 in a manner to control the current flowing in field winding 12. The illustrated control system is responsive to a field current command signal $I_c$ and to a feedback signal $I_{FB}$ representative of actual field winding current to control the conduction of the chopper circuit 24 and SCR 30. The feedback signal $I_{FB}$ is derived from a current measuring device 32 connected in the field winding circuit. The current measuring device 32 may be of a type well known in the art such as, for example, a current measuring reactor, or a Hall effect device. The commanded current signal $I_c$ and the current feedback signal $I_{FB}$ are combined in a first summing junction 34. The signal developed at the output line 36 from summing junction 34 is an error signal representative of the difference between the $I_c$ signal and the $I_{FB}$ signal. The error signal is applied to an amplifier 38 which includes a slight offset such that for small negative error signals a positive voltage output signal of small amplitude is provided. As the error signal becomes positive and increasing in value the output signal developed by the amplifier 38 increases from a small positive value to a larger positive value. The small offset in the amplifier is provided so that a dead band is avoided when the error signal magnitude is at or near zero. The amplified error signal generated by amplifier 38 is applied to an SCR firing circuit 40. The SCR firing circuit 40 is of a type well known in the art and may be, for example, of the type illustrated in the aforementioned U.S. Pat. No. 4,037,145. SCR firing circuit 40 provides gating signals on line 42 to gate the chopper circuit 24 into conduction and provides gating signals on line 44 to the chopper circuit 24 for terminating its conduction. In this manner the magnitude of voltage applied to field winding 12 can be controlled by regulating the ratio of conducting to non-conducting time of the chopper circuit 24. This in turn will control the average magnitude of current flowing through field winding 12 and thus the flux generated by field winding 12.

The SCR 30 is controlled by a circuit very similar to that which controls chopper circuit 24. In particular the $I_c$ signal is combined with the $I_{FB}$ signal in a summing junction 46 to provide an error signal on line 48 which is applied to an amplifier 50. However, the error signal from summing junction 34 on line 36 is identical to that on line 48 and could be used so that the junction 46 could be omitted. The amplifier 50 provides an output signal having a waveform essentially as that illustrated in the block diagram. For error signals of negative value the amplifier 50 provides a small magnitude positive output signal which increases from substantially zero magnitude for a large negative signal to a saturated or clamped larger positive magnitude at a small positive magnitude error signal. The output signal from amplifier 50 is applied to an SCR firing circuit 52 which applies gating signal to SCR 30. The SCR firing circuit 52 may be similar to the firing circuit 40 with the exception that there is no need to supply turn-off signals since the SCR 30 will be turned off whenever the chopper circuit 24 is gated on.

As is well known both the SCR firing circuit 40 and SCR firing circuit 52 respond to the magnitude of the error signals on their input terminals to control the time at which gating signals are developed on their output terminals. Since it is desired to have the SCR 30 conducting during the time period when the SCR 24 is non-conducting there is provided a clock oscillator 54 which generates synchronizing clock signals to the SCR firing circuit 40 and SCR firing circuit 52. Furthermore, in a system requiring regulation of the field winding current, the field winding current is typically controlled as a function of the magnitude of armature current. The detailed implementation of such an arrangement which functionally relates field winding current to armature current is well known to those having ordinary skill in the art. An example of such a system is shown in U.S. Pat. No. 4,012,677-Rist et al issued Mar. 15, 1977 and assigned to the General Electric Company.

In the operation of the above-described circuit, the field winding current command signal $I_c$ is applied to the summing junction 34. At the initial startup the $I_{FB}$ signal or current feedback signal will be substantially zero. Accordingly, the error signal at the output terminal of summing circuit 34 will be of relatively large value. The large error signal when applied to the amplifier 38 will result in a relatively large signal being applied to the SCR firing circuit 40. However, the typical SCR firing circuit includes an integrating circuit at its input in order to ramp up the firing signal at a fixed rate. Accordingly, firing pulses will be generated by the SCR firing circuit 40 and applied to the thyristor 24 at a gradually increasing rate. Thus, pulses of current will be applied to the field winding 12 and will result in a current buildup and flux buildup in this winding. During this current buildup process the error signal developed by summing junction 46 will be a positive value since $I_c$ will be larger than $I_{FB}$, and the signal developed at the output of amplifier 50 will be a relatively large value. The large magnitude of the signal developed by the amplifier 50 will cause the SCR firing circuit 52 to provide gating signals to SCR 30 is such a manner as to cause the SCR 30 to be gated into conduction as soon as conduction of chopper circuit 24 is terminated. During this period of operation, the SCR 30 appears essentially to act as a diode. As the field winding current increases, the error signal developed at the output of the summing junctions 34 and 46 gradually decrease. However, the integral plus proportional controller in the SCR firing circuit 40 maintains the chopper duty cycle at a value sufficient to minimize the error between $I_c$ and $I_{FB}$ signals. For steady state operation the error signal from summing junction 46 will maintain the signal at the output of amplifier 50 at substantially its maximum value such that the SCR 30 is continuously conductive during the non-conductive time of chopper circuit 24. If, however, the $I_c$ signal is reduced in value thereby commanding a reduced field winding current, the error signal at the output of summing junctions 34 and 46 becomes a negative value causing the amplifiers 38 and 50 to produce proportionately small output signals. The signal from amplifier 38 causes the SCR firing circuit to reduce the duty cycle of chopper 24 thereby reducing the effective field winding current. At the same time the signals from amplifier 50 inhibit or delay the firing signals developed by SCR firing circuit 52 such that the SCR 30 is maintained non-conductive during a portion of the non-conductive time of chopper circuit 24. During this portion of time the current produced by the inductive nature of field winding 12 is forced to circulate through the varistor 26 and diode 28. The circulating current through the varistor 26 raises the voltage across the field winding 12 to a relatively high value which acts as a large forcing function to rapidly reduce the field winding current. As the field winding current decreases the error signal at the summing junction of 46 becomes less negative and the SCR firing circuit 52 produces pulses which increase the conduction time of SCR 30 in such a manner as to regulate the average field winding current.

The use of the amplifiers 38 and 50 with a slight overlap in their operation for error signals at or near zero magnitude avoids a dead zone of operation and provides for a more stable current control system. The use of varistor 26 across the motor field winding permits the voltage across the field to be limited to a value less than the voltage necessary to cause the field to be overstressed and arc, i.e., the varistor resistance is reduced in proportion to the magnitude of voltage thereacross so that the voltage developed across the field winding 12 is limited. The diode 28 prevents current from the chopper 24 from propagating through the varistor 26 during the conducting time of chopper 24. The diode 28 thus minimizes the power dissipation in varistor 26.

FIG. 2 illustrates an alternate embodiment of the present invention in which the varistor 26 is replaced by a zener diode 54. The system of FIG. 2 operates in substantially the same manner as the system of FIG. 1, however, the zener diode 54 assures a constant forcing function is developed across the field winding 12 rather than a variable forcing function as would occur with use of a varistor such as that shown in FIG. 1.

A still further embodiment of the invention is shown in FIG. 3 in which the varistor 26 is replaced by a simple resistor 56. The system of FIG. 3 has of course the drawback associated with the use of a constant resistor, i.e., the voltage developed across the field winding is proportional to the current and may reach fairly large levels if the resistor is chosen overly large. Alternately, a smaller resistor can be used but in that situation the magnitude of the voltage developed across the field windings may be less than desired and thus not result in a desired reduction in the circuit time constant.

In each of the embodiments illustrated above, the current generated by the inductive action of the motor field during the non-conducting time of chopper circuit 24 is forced to circulate through a free wheeling path which includes a device to force a large voltage to be developed across the field winding 12. In these embodiments the voltage developed across the field winding 12 by virtue of the resistance in the free wheeling path acts as a large forcing function to rapidly force the current in the field to a lower value. However, rather than considering the resistive element as generating a large forcing function, it can also be seen that the addition of the resistance in the free wheeling path acts to vary the L/R time constant which controls the length of time which it takes for the current through the field winding 12 to decay. With a larger resistance value in the field current path the time constant is shortened so that field current decays more rapidly. Accordingly, the present invention provides a means for forcing the inductive load which is being controlled to react at a faster rate to command signals which determine the magnitude of current desired in the inductive load. Thus the invention as disclosed above overcomes the problems inherent in prior art systems in which the rapid response control system is limited by the length of time whcih it takes for an inductive load to respond to input command signals.

While the principles of the invention have now been made clear in an illustrative embodiment, there will be immediately obvious to those skilled in the art many modifications, constructions and arrangements used in the practice of the invention which are particularly adapted for specific environments and operating requirements without departing from those principles. The appended claims are therefore intended to cover and embrace any such modifications, subject only to the limits of the true spirit and scope of the invention.

What I claim as new and desire to secure by Letters Patent of the United States is:

1. In a power control system for a d-c electric traction motor having armature and field means and adapted to be energized from a source of d-c electric power, the improvement comprising:
 a. controllable switching means operatively positioned between said motor and said power source, said switching means having conducting and non-conducting states for repetitively interconnecting said source and said motor;
b. first control means adapted for controlling the time ratio of conducting to non-conducting states of said switching means in a manner to regulate the magnitude of current in said motor to a desired value;
c. impedance means connected in parallel circuit arrangement with said field means;
d. controllable electric valve means connected in parallel circuit arrangement with said field means and poled to conduct current in a direction opposite to the direction of current flow through said field means; and
e. second control means for controlling the conducting and non-conducting states of said electric valve means, said second means having a first mode of operation when said load current is less than or substantially equal to said desired value of current and having a second mode of operation when said load current is greater than said desired value of current, said second control means being operative in said first mode for gating said electric valve conductive whenever said switching means becomes non-conductive and being further operative in said second mode for controllably delaying gating of said electric valve means to thereby vary the time constant of said field means and force a more rapid decay of field current.

2. The system of claim 1 wherein said impedance means comprises a varistor connected in series with a unidirectional conduction means, said conduction means being poled to conduct current only during the non-conducting state of said controllable switching means.

3. The system of claim 1 wherein said impedance means comprises a zener diode connected in series with a unidirectional conduction means, said unidirectional conduction means being poled to conduct current only during the non-conducting state of said controllable switching means and said zener diode being reversely poled with respect to said conduction means.

4. The system of claim 1 wherein said impedance means comprises a resistor connected in series with a unidirectional conduction means, said conduction means being poled to conduct current only during the non-conducting state of said controllable switching means.

5. The system of claim 1 wherein said second control means is adapted to supply gating signals to said electric valve means substantially simultaneously with the beginning of said non-conducting state of said switching means whenever said error signal is representative of commanded load current being greater than the current in said load.

6. The system of claim 1 wherein said controllable switching means comprises a thyristor chopper circuit.

7. The system of claim 1 wherein said electric valve means comprises a silicon controlled rectifier.

8. The system of claim 1 wherein said armature and said field means are adapted to be separately excited, said switching means including a first chopper circuit for interconnecting said power source and said armature and a second chopper circuit for interconnecting said power source and said field means, and said first control means including a first chopper control system for controlling the duty factor of said first chopper in a manner to regulate current through said armature to a first desired value and a second chopper control system for controlling the duty factor of said second chopper in a manner to adjust current in said field means to a second desired value.

* * * * *